United States Patent
Fischer et al.

(10) Patent No.: US 10,164,402 B2
(45) Date of Patent: Dec. 25, 2018

(54) STABILIZING OPTICAL FREQUENCY COMBS

(71) Applicant: MENLO SYSTEMS GMBH, Martinsried (DE)

(72) Inventors: Marc Fischer, Munich (DE); Ronald Holzwarth, Groebenzell (DE); Olaf Mandel, Munich (DE)

(73) Assignee: MENLO SYSTEMS GMBH, Martinsried (DE)

( * ) Notice: Subject to any disclaimer, the term of this patent is extended or adjusted under 35 U.S.C. 154(b) by 0 days.

(21) Appl. No.: 15/552,941

(22) PCT Filed: Feb. 26, 2016

(86) PCT No.: PCT/EP2016/000335
§ 371 (c)(1),
(2) Date: Aug. 23, 2017

(87) PCT Pub. No.: WO2016/134853
PCT Pub. Date: Sep. 1, 2016

(65) Prior Publication Data
US 2018/0034233 A1   Feb. 1, 2018

(30) Foreign Application Priority Data

Feb. 27, 2015   (DE) .......... 10 2015 002 559

(51) Int. Cl.
*H01S 3/13* (2006.01)
*H01S 3/11* (2006.01)
(Continued)

(52) U.S. Cl.
CPC .......... *H01S 3/1307* (2013.01); *H01S 3/1106* (2013.01); *H01S 3/1305* (2013.01);
(Continued)

(58) Field of Classification Search
CPC .... H01S 3/1307; H01S 3/1106; H01S 3/1305; H01S 3/1312; H01S 3/137; H01S 3/094038; H01S 3/1625; H01S 3/1636
See application file for complete search history.

(56) References Cited

U.S. PATENT DOCUMENTS

| 7,602,825 B1 | 10/2009 | Lin et al. |
| 2003/0185255 A1* | 10/2003 | Ye .......... H01S 3/1109 372/18 |
| 2017/0093117 A1 | 3/2017 | Haensel et al. |

FOREIGN PATENT DOCUMENTS

| DE | 199 11 103 A1 | 9/2000 |
| DE | 100 44 404 A1 | 4/2002 |
| DE | 10 2014 204 941 A1 | 9/2015 |

OTHER PUBLICATIONS

International Search Report for PCT/EP2016/000335 (2 pages).
(Continued)

*Primary Examiner* — Armando Rodriguez
(74) *Attorney, Agent, or Firm* — Flynn Thiel, P.C.

(57) ABSTRACT

A method for operating a laser device (1), wherein an optical frequency comb can be stabilized and the frequencies of the modes thereof are describable by the formula $f_m = m \times f_{rep} + f_0$, where $f_{rep}$ is a mode spacing, $f_0$ is an offset frequency and m is a natural number. At least one signal (S1, S2, S3, S4) is determined, which correlates with an actual value of a degree of freedom (F), wherein the degree of freedom (F) is a linear combination of the offset frequency $f_0$ and the mode spacing $f_{rep}$ of the frequency comb. The actual value of the degree of freedom (F) is set in a predetermined capture range (F) of a second control unit (40) using a first control unit (10) on the basis of the signal. As soon as the capture range ($\Delta F_{capture}$) of the second control unit (40) is reached, the
(Continued)

second control unit (40) is activated and the actual value is regulated to an intended value ($\Delta F_{intended}$) with the aid of the second control unit (40).

21 Claims, 4 Drawing Sheets

(51) Int. Cl.
  *H01S 3/131* (2006.01)
  *H01S 3/137* (2006.01)
  *H01S 3/139* (2006.01)
  *H01S 3/094* (2006.01)
  *H01S 3/16* (2006.01)
(52) U.S. Cl.
  CPC .............. *H01S 3/137* (2013.01); *H01S 3/139* (2013.01); *H01S 3/1312* (2013.01); *H01S 3/094038* (2013.01); *H01S 3/1394* (2013.01); *H01S 3/1625* (2013.01); *H01S 3/1636* (2013.01)

(56) References Cited

OTHER PUBLICATIONS

English translation of International Preliminary Report on Patentability for PCT/EP2016/000335, dated Sep. 8, 2017 (2 pgs.).
English translation of Written Opinion of the International Searching Authority for PCT/EP2016/000335, dated Jun. 9, 2016 (5 pgs.).

* cited by examiner

STABILIZING OPTICAL FREQUENCY COMBS

FIELD OF THE INVENTION

The invention relates to the field of optical frequency combs. As discussed in the following, the inventive method may be used for stabilizing optical frequency combs.

BACKGROUND OF THE INVENTION

As is well known, an optical frequency comb may be generated by providing a short or ultrashort laser pulse. Such a laser pulse may have a pulse period in the range of picoseconds to femtoseconds. However, even longer or smaller pulse periods are possible, for instance in the range of attoseconds to microseconds.

Figure 2:
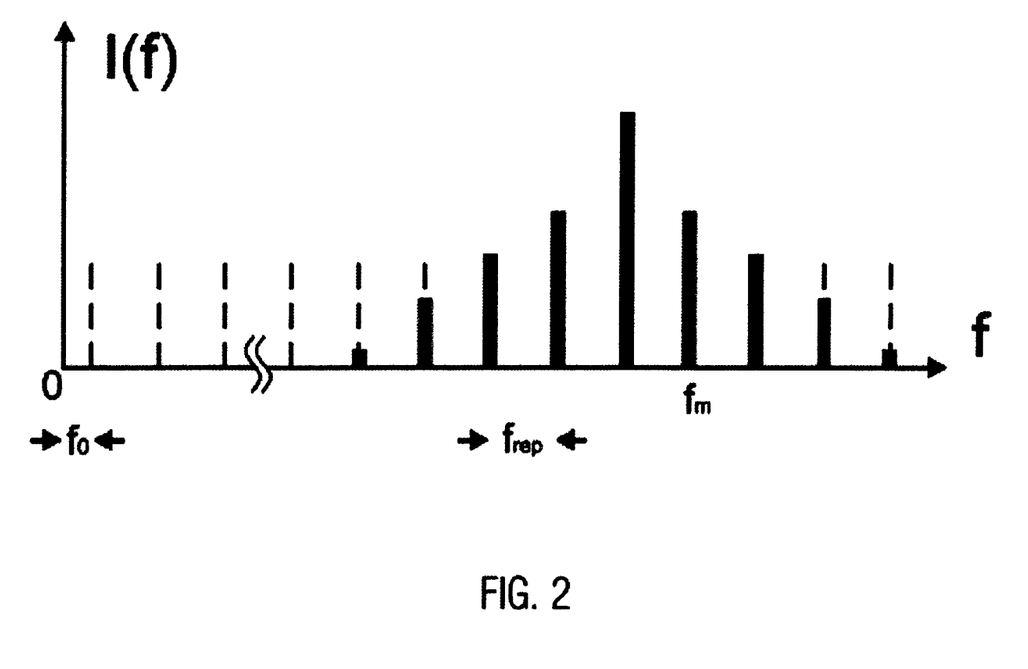
FIG. 2 illustrates a frequency domain representation of modes of an exemplary frequency comb with the frequency being plotted along the horizontal axis and the light intensity being plotted along the vertical axis.

In the frequency domain, a sequence of laser pulses may be represented as a frequency comb. FIG. 2 illustrates such a representation in the form of a frequency comb, wherein the optical intensity I is plotted against the frequency f. The frequency comb comprises modes of discrete optical frequencies $f_m$. An envelope of the intensity progression may lie within the amplification band width of a laser medium that generates the laser pulse. The width of the envelope is inversely proportional to the pulse period of the laser pulse.

As is well known, the frequencies of the modes of an optical frequency comb may be generally described by the formula $f_m = m \times f_{rep} + f_0$ with m being a natural number and $f_{rep}$ and $f_0$ having the measurement unit of a frequency. As is evident from this formula and FIG. 2, the frequencies of adjacent modes of the optical frequency comb have the spacing $f_{rep}$ referred to as a mode spacing of the frequency comb. When the frequency comb corresponds to a laser pulse circulating in a resonator, the mode spacing $f_{rep}$ corresponds to the pulse repetition frequency (=repetition rate) of the oscillator, that is, the inverse of the round trip time of the pulse in the oscillator.

Usually, the modes of the frequency comb are not exactly an integer multiple of $f_{rep}$. As is evident from the above formula and FIG. 2, the frequency comb may be offset by an offset frequency $f_0$. There may, however, also exist the case where $f_0$ is equal to 0 and, thus, the modes of the frequency comb are integer multiples of $f_{rep}$. For a laser pulse circulating in a resonator, the presence of the offset frequency $f_0$ may have its reason in the fact that the group velocity of a pulse circulating in the oscillator is different from the phase velocity of the individual modes of the pulse.

It is evident to the skilled person that the description of the modes of the frequency comb by the formula $f_m = m \times f_{rep} + f_0$ is an idealized representation. The modes of a real frequency comb may have a finite width in the frequency domain.

Optical frequency combs may be used, for instance, in the area of spectroscopy, in particular, the spectroscopy of electronic transitions in atoms or for highly precise frequency measurements. For these applications, it is important to be able to stabilize a frequency comb. "Stabilizing a frequency comb" in the context of the present invention is to mean a stabilizing of the position of at least one of the modes of the frequency comb. An active stabilizing may be necessary, since the mode spacing $f_{rep}$ and the offset frequency $f_0$ may respond very sensitively to an external influence. For a laser pulse in a resonator, even a minute change of the resonator length and, thus, of the repetition rate, results in a change of the mode spacing $f_{rep}$ of the frequency comb. A change of the offset frequency $f_0$ may, for instance, be caused by a change of the dispersive characteristics in the resonator.

DE 199 11 103 A1 and DE 100 44 404 A1 disclose the stabilizing of optical frequency combs by controlling the two parameters, i.e., the frequency $f_0$ and the mode spacing $f_m$. DE 199 11 103 A1 discloses to change the resonator length by means of a movable deflection mirror so as to control the mode spacing of the frequency comb. Moreover, it is disclosed that the offset frequency may be adjusted by tilting a resonator mirror or by inserting a pair of prisms into the optical path of the resonator.

After providing the frequency comb, the parameters of the frequency comb (offset frequency $f_0$ and mode spacing $f_{rep}$) may be undetermined. Generally, immediately after providing the frequency comb, at least one of these parameters is undetermined. Also during operation of the frequency comb, at least one of the parameters may be undetermined or may become undetermined, for instance, due to a change of a physical constraint.

Known control loops for stabilizing the frequency comb may be activated in a non-reliable manner only. The reason for this is that the usual control loop may stabilize a parameter of a frequency comb only when it is already (incidentally) within a range defined by the characteristics of the control loop. Otherwise, the control loop will typically begin oscillating, run to a limit of its control range, or control the frequency comb on the basis of a noise signal.

OBJECT OF THE INVENTION

It is, therefore, an object of the present invention to provide a method for operating a laser device with which a frequency comb may be stabilized in a simple and reliable manner.

SUMMARY OF THE INVENTION

A frequency comb may be generated, for instance, by a femtosecond laser (Fs-laser), in particular, an Fs-fiber Laser. The frequency comb may be generated, for instance, in a resonator, in particular, a microresonator, or by an optically parametric oscillator (OPO). Also, the generation of the frequency comb by modulation of a continuous wave laser (EOM (electro-optical modulator) combs, combinations of phase and frequency modulation) or by optical rectification is possible. Usage of a differential frequency comb, as described in U.S. Pat. No. 6,724,788 B1, is also possible. The frequency comb may also be adjusted in any other manner. Moreover, it is possible that the frequency comb used may be changed afterwards by AOMs (acusto-optical modulator) or by EOMs.

According to the present invention, an optical frequency comb is provided so as to have a plurality of modes, the frequencies of which may be described by the formula $f_m = m \times f_{rep} + f_0$. This frequency comb is to be stabilized. To this end, at least one signal is determined that is correlated with an actual value of a degree of freedom F of the frequency comb. According to the present invention, the degree of freedom F of the frequency comb is a linear combination of the offset frequency $f_0$ and the mode spacing $f_{rep}$ of the frequency comb. Therefore, the degree of freedom F may also be expressed by the following formula: $f = v \times f_{rep} + w \times f_0 + c$, wherein v and w are real numbers and c has the measurement unit of a frequency. Only the case may be excluded, according to which v and w are both equal to 0. Explicitly within the scope of the present invention are the cases $F=f_{rep}$ (v=1, w=c=0) and $F=f_0$ (w=1, v=c=0). In any case the degree of freedom F characterizes the frequency comb or properties of the frequency comb. For a full description of a frequency comb, there is required at least one degree of freedom F.

According to the invention, a first input signal that is included in the set of the at least one signal is transmitted to a first control unit. Advantageously, a plurality of first input signals, each of which is included in the set of the at least one signal, may be transmitted to the first control unit.

According to the present invention, based on the transmitted at least one first input signal, the actual value of the degree of freedom is adjusted with the first control unit so as to be within a predetermined capture range of a second control unit. This is a step preceding the actual stabilizing of the actual value, thereby insuring that the corresponding control loop is effective. The actual stabilizing is then obtained by the second control unit.

If the actual value is within the capture range of the second control unit, the second control unit is activated. Whether the actual value is within the capture range may be determined, for instance, by newly measuring the actual value of the degree of freedom.

Once the second control unit is activated, the actual value is controlled with the aid of the second control unit to a predetermined target or intended value. In this manner, the frequency comb is stabilized. Depending on the specific selected degree of freedom F, a target or intended value appropriate for a specific application may be selected. The actual value of the degree of freedom does not necessarily need to be brought into precise agreement with the target value for a successful stabilization. It may be sufficient to maintain the actual value of the degree of freedom within a given range around the target value. The target value may be selected such that the mode spacing $f_{rep}$ of the frequency comb is stabilized, for instance, within a range around 250 MHz and/or the offset frequency $f_0$ may be stabilized in a range between 0 and 125 MHz. The stabilizing may be accomplished such that the actual value is identical within some Hz to the target value, for instance, up to 2 Hz, 5 Hz, 10 Hz, 20 Hz, 50 Hz or 100 Hz, or such that at the most deviations of the actual value from the target value of less than 1%, less than 3%, less than 5% or less than 10% are allowed. If the degree of freedom F corresponds to the mode spacing $f_{rep}$ of the frequency comb, the stabilizing may be accomplished such that the actual value is identical to the target value within 1 mHz or 5 mHz. If the degree of freedom F corresponds to the offset frequency $f_0$ of the frequency comb, the stabilizing may be accomplished such that the actual value is identical to the target value within 1 Hz or 5 Hz. The matching with the target value may be evaluated within a certain integration time, for instance, over one or several seconds.

Hence, according to the present invention, the laser device is operated in a two-step procedure. By means of the first control unit, the actual value of the degree of freedom is brought into the predetermined capture range of the second control unit. In this manner, it is ensured that the second control unit is able to reliably control the actual value to the target value. In principle, a known system for stabilizing a frequency comb may be used as the second control unit. The inventive method ensures that the control by the second control unit may be reliably activated and may be operational in short time.

At least one second input signal being included in the set of the at least one signal and, thus, being correlated with the actual value of the degree of freedom, may be transmitted to the second control unit. Advantageously, the second control unit comprises a single second control loop or a plurality of second control loops that control one or more actuators on the basis of the at least one second input signal.

In this case, it is possible that each second control loop corresponds to one actuator. Alternatively, an actuator may be controlled by several second control loops. Advantageously, all of the second control loops control the one or more actuators on the basis of a single second input signal included in the set of the at least one signal. The single second input signal is, therefore, commonly used by the second control loops. In this manner, the stabilizing of the frequency comb may be simplified, since the number of signals to be measured is maximally reduced. Even if only a single second input signal is used, several control stages may be implemented within the second control unit so as to implement a preferably fast control, while at the same time, providing for a wide dynamic range and control range. Also, it is possible for each second control loop to have its own second input signal.

The second control loops may be cascaded. In this manner, second control loops arranged upstream may bring into or keep within their control ranges respective second control loops arranged downstream. In particular, second control loops arranged upstream within the cascade may have an adjustment accuracy that is coarser compared to the downstream-arranged control loops. This may be realized by an appropriate selection of the actuators or the used second input signals. Advantageously, the cascaded second control loops access different actuators that have different adjustment accuracies.

The second control loops, in combination with the corresponding actuators, may be configured to be capable of reliably controlling the actual value of the degree of freedom to the predetermined target value as long as the actual value is within the capture range of the second control unit. The capture range may be restricted by several characteristics of the second control unit. For example, when a piezoelectric actuator is used as an actuator by the second control unit in order to move a resonator mirror, the capture range may be restricted by the limited range of motion of the piezoelectric control element. It is also possible that an error signal used for stabilizing (for example, the difference between the corresponding second input signal and the given target value of the degree of freedom) may be strongly damped outside of a specific range so that stabilization is not possible. It is also possible that the second input signal used for stabilizing is outside of a detection range. This may represent a problem, in particular, when the offset frequency $f_0$ of a frequency comb is to be controlled.

The second control loops may include both phase control (so-called phase locked loops) and frequency control loops as are known from control theory. These loops may be realized both in the form of electronic circuits and in software.

In order to bring the actual value of the degree of freedom into the capture range of the second control unit, the first control unit may comprise several first control loops. Advantageously, these are used sequentially one after the other. In a simple embodiment, it is also possible that a first control unit comprises only one first control loop.

The first control loops may use the at least one first input signal for controlling the actual value. It is possible that the at least one first input signal includes the second input signal. In this case, the measurement device for determining the second input signal to be provided anyway, may also be used by the first control unit. Advantageously, the at least one first input signal comprises at least one signal that is not used by the second control unit. Such a first input signal is preferably measurable in a greater range compared to the signals as used by the second control unit. An increase of the measurement range is usually accompanied by a certain degradation of the measurement resolution. This may be acceptable for the first control unit, since the first control unit merely shifts the actual value of the degree of freedom into the capture range of the second control unit. For a signal used by the first control unit, a broad detection range is more important than high resolution, since in this case, actual values of the degree of freedom with increased spacing from the target value may be detected and may be brought into the capture range of the second control unit.

It is advantageous for the first control unit to selectively activate one or several second control loops. In this manner, the control by the second control unit may directly be activated by the first control unit once the actual value is within the capture range. Advantageously, several second control loops may be separately activated. In this manner, a most appropriate second control unit may be activated in accordance with circumstances. It is also possible to commonly activate all of the second control loops or several thereof, for instance, when these are cascaded.

The first control unit may comprise a state machine configured to activate the second control loops. The state machine may also coordinate the sequential operation of the first control loops. To this end, the at least one signal measured may be supplied to the state machine. By using the state machine, the method according to the present invention may be even further automated. In this manner, a reliably fully automatic activation of a stabilization of a frequency comb may be implemented without having to "blindly" move actuators "manually," until a stabilization is effective.

It may be advantageous when the first control unit uses and/or adjusts one or several actuators controlled by the second control loops in parallel or instead of the second control unit. In this manner, the number of required actuators may be reduced.

It is also possible that at least one actuator that is independent of the second control unit is driven by the first control unit. This actuator may have an increased adjustment range compared to the actuators controlled by the second control unit. In this manner, actual values of increased distance from the target value may be brought into the capture range of the second control unit. A reduction of the adjustment accuracy possibly associated with the increased adjustment range may be generally acceptable in the first control unit.

The first and second control units may each be configured to process at least one actuator signal that represents the control value of an actuator.

Conveniently, the at least one first input signal used by the first control unit has a validity range as large as possible, preferably substantially centered around the target value. "Validity range" refers to the range of values of the degree of freedom, in which the determination of the at least one first input signal results in a correct measurement value. Advantageously, the validity range of the first input signal is greater than the capture range of the second control unit, in particular, at least by 5 times, 10 times, 20 times, 100 times or even 10,000 times. When the mode spacing $f_{rep}$ is measured for determining the first input signal, the capture range may comprise 500 Hz (measurement by phase detector) and the validity range may be 10 MHz (measurement by counter). If the offset frequency $f_0$ is measured for determining the first input signal, the capture range may comprise 2 MHz and the validity range may be 20 MHz.

Should the actual value of the degree of freedom nevertheless be outside the validity range of the first input signal, it is convenient that the first control unit may detect this fact by means of a further first input signal and then modifies a control value of at least one actuator until the validity range is reached again. Advantageously, in this case, the control value of the at least one actuator is uniformly varied, for instance, in constant steps. In this manner, it may be guaranteed that the validity range will be reached again. Alternatively, the control value of the actuator may be varied in a stochastic manner in order to rapidly reenter the validity range. Advantageously, outside the validity range, the at least one actuator is driven depending on one or more previous states of the first control unit so as to preferably efficiently bring the actual value back into the validity range. The variation of the control value of at least one actuator may be controlled by the state machine of the first control unit. This is advantageous, since the state machine is configured to drive the actuator anyway. Moreover, the process may be further automated in this manner. To this end, the state machine may control a function generator that outputs one control signal/several control signals to one or more actuators depending on the input of the state machine.

For verifying whether the actual value is within the validity range, a power level of a beat signal may be determined. To this end, a laser pulse forming the optical frequency comb may be made to interfere with a reference signal of known frequency. In this case, a beat is generated, whose beat frequency corresponds to the difference in frequency between the frequency $f_m$ of a mode of the frequency comb and the frequency of the reference signal. The optical beat signal may be converted into an electrical signal, for instance, by a photodiode, and may then be passed through a frequency filter. By evaluating the signal level, it may be determined whether the beat frequency is within a predefined range (pass range of the frequency filter). With an appropriate selection of the reference signal and the frequency filter, it may be determined whether the actual value is within the validity range. The beat signal may also be generated, for instance, by an f:2f interferometer. Since within the scope of the present invention, resources for determining a signal correlated with the actual value of the degree of freedom have to be provided anyway, it may be determined without undue additional effort whether a successful stabilizing of the degree of freedom has been accomplished. To this end, it may be determined whether the actual value is within a specified range around the target value, preferably for a predefined time span. If a state of successful stabilization is detected, this state may be displayed or may be output as a message. In this manner, it is accomplished that the frequency comb may be integrated into a higher-level automated system. The frequency comb may report to a unit of the higher-level system the point in time when it is available for being used by this system. In this manner, it is no longer necessary for a user to monitor the activation procedure of the frequency comb.

BRIEF DESCRIPTION OF THE DRAWINGS

Hereinafter, the invention and its advantages will be explained in more detail by means of drawings. In the drawings.

DETAILED DESCRIPTION OF THE INVENTION

Figure 1:
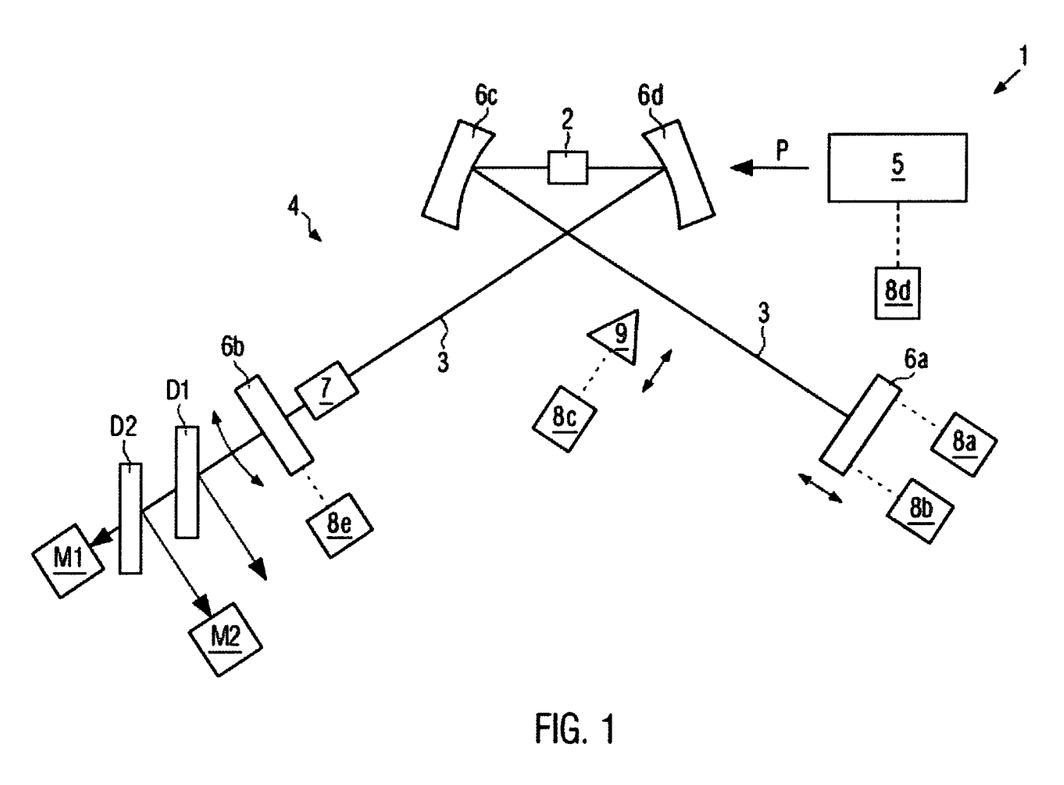
FIG. 1 illustrates a schematic representation of a portion of an exemplary laser device that may be operated by the inventive method.

FIG. 1 illustrates an exemplary laser device 1 that may be operated by using the inventive method. It should be appreciated, however, that the inventive method may be used for operating other laser devices as long as the provision of an optical frequency comb is possible.

In the laser device 1 of FIG. 1, a laser active medium 2 is provided on an optical axis 3 of a resonator 4. The laser active medium 2 may, for instance, be a Ti:Sa crystal. Other laser active media, in particular, laser crystals such as, for instance, Yb:YAG, Cr:LiSAF or Cr:Forsterite are possible. The laser active medium 2 is pumped by a pump laser beam P generated by a pump laser 5 disposed outside the resonator 4.

The resonator 4 may comprise several resonator mirrors 6a, 6b, 6c, 6d. In the embodiment illustrated, the resonator 4 is a linear resonator. In this case, two resonator mirrors, i.e., the mirrors 6a and 6b, form resonator end mirrors. Any number of further resonator mirrors 6c, 6d may be disposed on the optical axis 3 of the resonator 4 between the resonator end mirrors 6a, 6b. Alternatively, it is possible to provide the resonator 4 in the form of a ring resonator such that the resonator 4 does not have any resonator end mirrors.

One of the resonator mirrors 6d is advantageously configured as a mirror appropriate for coupling in pump laser radiation P. Moreover, preferably a coupling-out mirror (in FIG. 1 the resonator mirror 6b) is provided for coupling laser light out of the resonator 4. For enhanced beam guiding, it may be appropriate to provide some of the resonator mirrors 6a, 6b, 6c, 6d as curved mirrors. It is also possible that one or more of the resonator mirrors are chirped mirrors. In this way, superior dispersion compensation may be achieved in the resonator 4. It may be advantageous to provide a mode coupling element 7 within the resonator 4, for instance, a Kerr lens or a saturable absorber.

It is also possible that no laser active medium 2 is provided within the resonator 4, and instead, the laser radiation is coupled directly into the resonator 4 by an in-coupling mirror (similar to the pump laser radiation P). The radiation circulating in the resonator 4 may, in particular, represent a pulsed laser radiation, in particular, short or ultrashort laser pulses.

FIG. 2 illustrates in the frequency domain representation the position of the modes of an optical frequency comb associated with the optical radiation circulating in the resonator 4. The optical frequency comb comprises a plurality of modes having intensities I(f) the frequencies of which may be described in the frequency domain f by the formula $f_m = m \times f_{rep} + f_0$, wherein m is a natural number, $f_{rep}$ is a mode spacing and $f_0$ is an offset frequency. The position of the modes of the frequency comb is, thus, determined by the parameters offset frequency $f_0$ and mode spacing $f_{rep}$.

Within or at the resonator 4, one or more actuators 8a, 8b, 8c, 8d, 8e may be provided, with the aid of which the position of the modes of the frequency comb is adjustable. One actuator may represent, for instance, a device for adjusting the resonator length, in particular, for moving a resonator end mirror 6a along the optical axis 3 of the resonator 4, in particular, a mechanical step motor 8a, a piezo-electric motor 8b and/or an electro-optical modulator (EOM). In the context of the present invention, it has proven to be particularly advantageous to provide a plurality of actuators having different adjustment accuracies and different adjustment ranges for adjusting the resonator length. Depending on the circumstances, this allows adjustment either so as to have an increased range or to have superior accuracy. To this end, for moving the resonator end mirror 6a, a mechanical step motor 8a and a piezo-electric motor 8b are provided, wherein the adjustment step size of the piezo-electric motor 8b is finer compared to that of the mechanical step motor 8a. It is also possible to provide a piezo-electric motor 8b and an electro-optical modulator, wherein the adjustment step size of the electro-optical modulator is finer compared to that of the piezo-electric motor 8b.

As further potential actuators that may be provided alternatively or additionally an apparatus for inserting an optical prism 9 into the optical path of the resonator 4 may be used. Again, this may be accomplished by a mechanical step motor 8a and/or a piezo-electric motor 8b. By inserting the optical prism 9 into the optical path of the resonator 4 or by moving the position of the prism 9 along a direction perpendicular to the optical axis 3 of the resonator 4, both the mode spacing $f_m$ of the frequency comb (through effects of the prism 9 onto the repetition rate) and the offset frequency $f_0$ (through dispersive effects of the prism 9) may be varied.

For variation of the offset frequency $f_0$, it is also possible to provide, as an actuator, a tilting device 8e for an end mirror 6b of the resonator 4. To this end, for instance, the end mirror 6b may be tilted around an axis oriented perpendicularly to the optical axis 3 of the resonator 4.

An example of an actuator that is not directly provided at or within the resonator 4 is a power controller 8d for the power of the pump laser 5. By varying the pump power, the position of the frequencies of the frequency comb may be adapted, in particular, by non-linear intensity dependencies of dispersive characteristics in the resonator 4, in particular, in the laser active medium 2.

In FIG. 1, several actuators 8a, 8b, 8c, 8d, 8e are shown for illustrative purposes. A lower number of actuators may be provided as well, for instance, one, two or three. For instance, providing further actuators is also an option.

According to the present invention, at least one signal S1, S2, S3, S4 may be determined, which is correlated with an actual value of a degree of freedom F of the frequency comb. In the context of the present invention, the degree of freedom may be an arbitrary linear combination of the offset frequency $f_0$ and the mode spacing $f_{rep}$ of the optical frequency comb. In particular, it may be advantageous when the degree of freedom corresponds to the mode spacing $f_{rep}$ or the offset frequency $f_0$ and, therefore, the signal correlates with an actual value of the mode spacing $f_{rep}$ or the offset frequency $f_0$.

In case that the degree of freedom F corresponds to the mode spacing $f_{rep}$ of the frequency comb, the at least one signal S1, S2, S3, S4 may be determined by evaluating a beat of adjacent modes of the frequency comb. To this end, for instance, the number of oscillations of the beat signal may be determined within a specified time interval by means of a photodetector M1, M2.

In case that the offset frequency $f_0$ is used as the degree of freedom F, determining the at least one signal may be accomplished by means of an f:2f-interferrometer. To this end, one component of the optical radiation associated with the frequency comb is doubled in frequency and is superimposed with a non-frequency doubled component of the optical radiation. The generated beat includes a frequency that corresponds to the offset frequency $f_0$ of the frequency comb and may be measured by known means.

In FIG. 1 there are illustrated two measurement devices M1, M2 that perform one or more measurements for determining the at least one signal S1, S2, S3, S4. In this case, a laser pulse corresponding to the frequency comb may be measured. As a further option, only one or more than two measurement devices M1, M2 may be provided. A laser pulse exiting the resonator 4 at the out-coupling mirror 6b is divided into two subpulses at a first beam splitter D1 in FIG. 1. One of the subpulses is passed on for an application-specific use. The other subpulse is further split at a second beam splitter D2. The two subpulses of second generation generated in this manner are each supplied to the measurement devices M1, M2. A different positioning of the measurement devices M1, M2 is also an option, for instance, within the resonator 4. The measurement devices M1, M2 may represent an interferometer or photo diode or other measurement devices.

Figure 3:
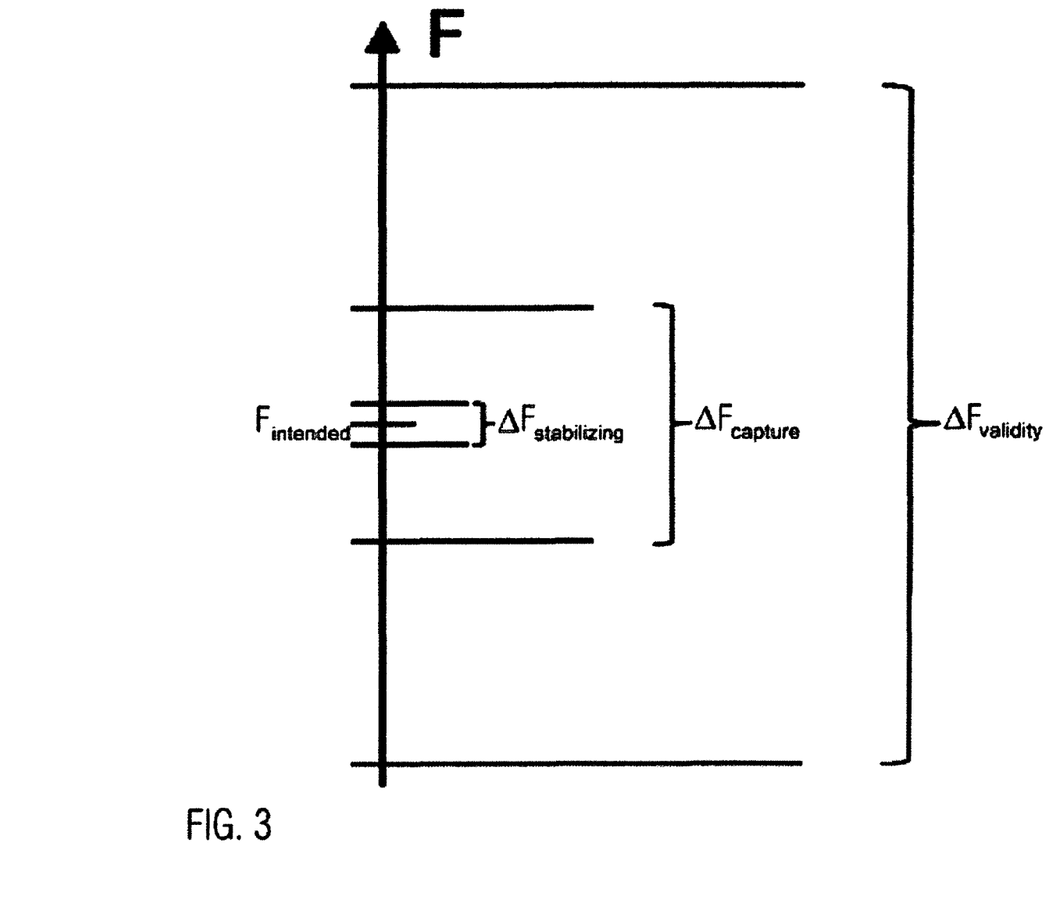
FIG. 3 illustrates a schematic representation of some relevant ranges of values for the inventive degree of freedom of a frequency comb.

As discussed later on, the actual value of the degree of freedom F is controlled to a target value or intended value $F_{intended}$. Such a control is accomplished when the actual value of the degree of freedom F is within a stabilizing range $\Delta F_{stabilizing}$ that includes the target value $F_{intended}$, as will be described later on in more detail. FIG. 3 illustrates the mutual relationship between the target value $F_{intended}$ and the stabilizing range $\Delta F_{stabilizing}$ in relation to further ranges of values of the actual value of the degree of freedom F, as will be described later on, i.e., the capture range $\Delta F_{capture}$ of the second control unit 40, described later on, and the validity range $\Delta F_{validity}$ of the at least one signal S1, S2, S3, S4.

Figure 4:
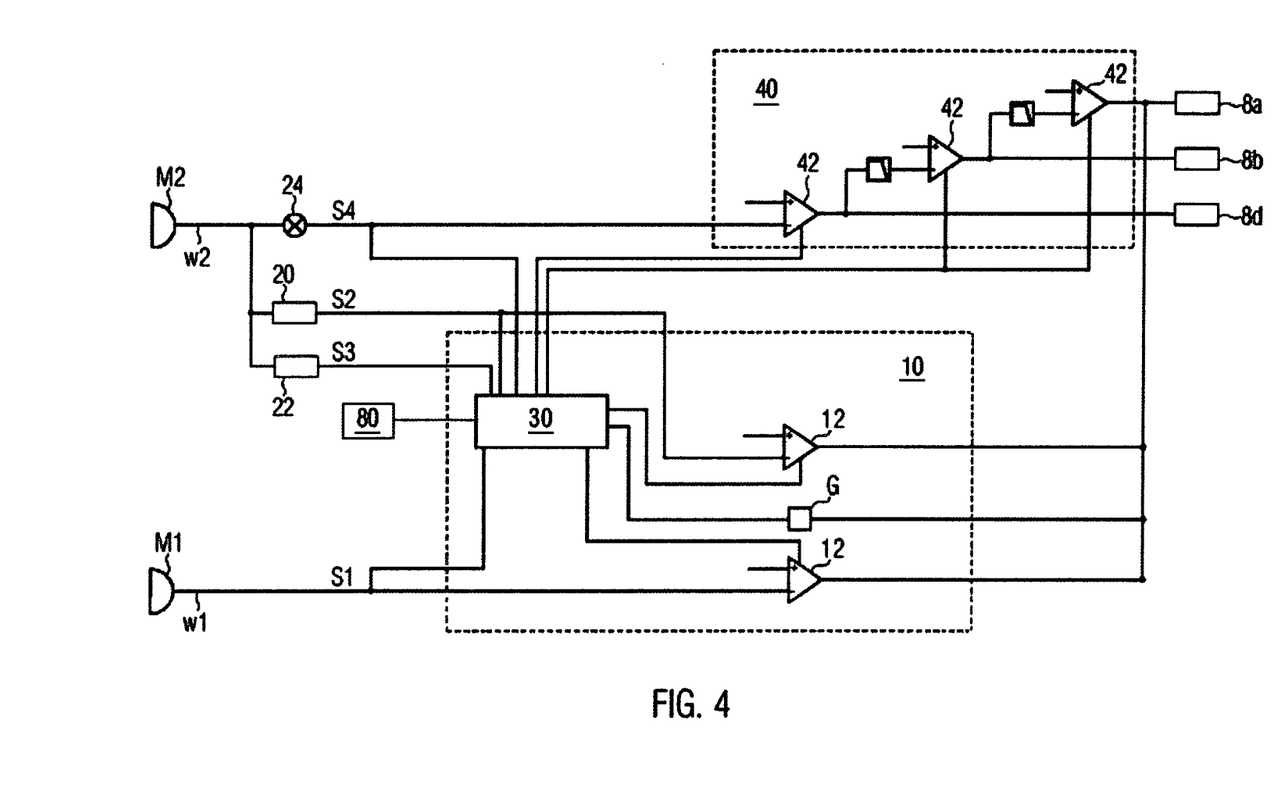
FIG. 4 shows a schematic representation of at least a part of a signal processing system for implementing the inventive method according to one embodiment.

FIG. 4 illustrates a signal processing scheme by which the inventive method may be realized according to an embodiment.

Measurement values W1, W2 as obtained from the measurement devices M1, M2 may directly represent a signal correlating with the actual value of the degree of freedom F of the frequency comb. It is also an option that the at least one signal S1, S2, S3, S4 is obtained from a measurement value W1, W2 by further processing. For example, a measurement value W2 may be converted into the signal by a post-processing unit 20, 22, 24, in particular, by amplification, normalization, frequency mixing and/or level measurement. As shown in FIG. 4, several signals S2, S3, S4 may be obtained from a measurement value W2 of the measurement device M2 by respective different post-processings by means of the post-processing units 20, 22, 24, wherein the signals correlate with the actual value of the degree of freedom F. The measurement value W1 of the measurement device M1, on the other hand, may be directly used as signal S1.

According to the present invention, it is possible that merely a single signal S1, S2, S3, S4 that correlates with the actual value of the degree of freedom F be determined. Advantageously, however, two, three, four, five or more signals S1, S2, S3, S4, correlating with the actual value with the degree of freedom F may be determined.

A signal S1 obtained by a first measurement device M1 and correlating with the actual value of the degree of freedom F is transmitted to a first control unit 10 as a first input signal. A first control loop 12 of the first control unit 10 receives this first input signal. It is an option that further first control loops 12 are provided that may also receive this first input signal or alternatively may receive a different signal correlating with the actual value of the degree of freedom F. In the embodiment shown in FIG. 4, a further signal S2 derived from a measurement value W2 of the second measurement device M2 by means of the post-processing unit 20 is transmitted to a further first control loop 12 of the first control unit 10 as a further first input signal.

Preferably, the first control loops 12 are used sequentially. The sequential use of the first control loops 12 is preferably controlled by a state machine 30 of the first control unit 10. To this end, the state machine 30 may also receive the at least one first input signal and may decide, depending on at least one first input signal, to further continue in the sequence of the first control loops 12. To this end, the state machine 30 may activate or deactivate, preferably individually, the first control loops 12. It is advantageous when the state machine 30 is supplied with all the signals from the set of the at least one determined signal S1, S2, S3, S4.

According to the present invention, by means of the first control unit 10 the actual value of the degree of freedom F is adjusted to a predetermined capture range $\Delta F_{capture}$ on the basis of the at least one first input signal. To this end, the first control loops 12 have access to one or more actuators 8a, 8b, 8d. In this respect, it is possible that each of the first control loops 12 may drive the same actuator 8a, 8b, 8d. Alternatively, the first control loops 12 may drive different actuators 8a, 8b, 8d to gain access to different adjustment ranges. In the embodiment shown in FIG. 4 the two first control loops 12 control the step motor 8a for moving the resonator end mirror 6a.

In particular, immediately after turning on the frequency comb, there may exist the possibility that the actual value of the degree of freedom F is outside of a given validity range $\Delta F_{validity}$ of a signal from the set of the at least one determined signals S1, S2, S3, S4. The validity range $\Delta F_{validity}$ may be different for each of the signals S1, S2, S3, S4 and may be the range of values of the actual value in which the signal S1, S2, S3, S4 correlates with the actual value of the degree of freedom F such that a one-to-one relation exists between the signal S1, S2, S3, S4 and the actual value. In other words, the validity range $\Delta F_{validity}$ is the range in which the actual value is correctly determined by determining the signal S1, S2, S3, S4.

It may be verified whether the actual value is within the validity range $\Delta F_{validity}$. This may be accomplished, for instance, by evaluating one of the signals S1, S2, S3, S4 correlating with the actual value of the degree of freedom F by means of the state machine 30. If, for instance, a beat of two subsequent frequency comb modes is provided by the second measurement device M2 and is converted into an electrical signal, the post-processing unit 22 may be configured as a beat analyzer. It may be used to first supply the electrical beat signal to a frequency filter configured to pass frequencies within a determined range only, and then the power level downstream of the frequency filter is supplied to the state machine 30 as signal S3. The state machine 30 may then determine on the basis of the power level whether the actual value of the degree of freedom F, for example, the mode spacing $f_{rep}$, is within the validity range $\Delta F_{validity}$ of a signal S1, S2, S3, S4.

In case that the actual value is outside of the set validity range $\Delta F_{validity}$ of a signal used as first input signal for driving an actuator 8a, 8b, 8c, 8d, 8e, the adjustment process is temporarily interrupted by those first control loops 12 that use the corresponding signal S1, S2.

If the actual value for any signals S1, S2 used as first input signals is outside of the corresponding validity range $\Delta F_{validity}$, all of the first control loops 12 are deactivated and the control value of at least one actuator (for example, of the step motor 8a in FIG. 4) is varied in a stochastic or uniform manner until the validity range $\Delta F_{validity}$ is reached again in order to reenter into the range of reliable measurements and, thus, a meaningful adjustment by the first control loops 12. To this end, the state machine 30 communicates with the function generator G that controls the stochastic or uniform variation of the actuator control value depending on an input of the state machine 30. After having received information on preceding signals S1, S2, S3, S4 and actuator adjustments, the state machine 30 may control the function generator G depending on preceding states so as to reenter as fast as possible the validity range $\Delta F_{validity}$ of at least one signal S1, S2 used as first input signal.

On the basis of at least one signal S1, S2, S3, S4 provided to the state machine 30 and correlating with the actual value of the degree of freedom F, the state machine 30 determines whether the actual value is within the capture range $\Delta F_{capture}$ of the second control unit 40. As illustrated in FIG. 3, the capture range $\Delta F_{capture}$ of the second control unit 40 may be within the validity range $\Delta F_{validity}$, wherein the target value $\Delta F_{intended}$ is within the validity range $\Delta F_{validity}$ and within the capture range $\Delta F_{capture}$, preferably substantially centered. The capture range $\Delta F_{capture}$ may be determined as the range in which the second control unit 40 is capable of controlling the actual value to the target value $F_{intended}$. To this end, the target value $F_{intended}$ is within the capture range $\Delta F_{capture}$, preferably centered. A control of the actual value to the target value $F_{intended}$ is accomplished, according to the present invention, if the actual value is within a stabilizing range $\Delta F_{stabilizing}$ that includes the target value and, in particular, is centered around the target value $F_{intended}$, i.e., a portion of the capture range $\Delta F_{capture}$. The stabilizing range $\Delta F_{stabilizing}$ in this respect may allow a deviation of the actual value from the target value $F_{intended}$ by less than 1%, less than 3%, less than 5% or less than 10% of the target value $F_{intended}$. Alternatively, the stabilizing range $\Delta F_{stabilizing}$ may allow a deviation of the actual value from the target value $F_{intended}$ by only several Hz or even mHz, for instance by 1 mHz, 10 mHz, 2 Hz, 5 Hz, 10 Hz, 20 Hz or 50 Hz at most.

When the state machine 30 determines that the actual value is within the capture range $\Delta F_{capture}$ of the second control unit 40, then the second control unit 40 is activated, preferably by the state machine 30. Thereafter, the actual value is controlled to the target value $F_{intended}$ by means of the second control unit 40. To this end, the second control unit 40 comprises one or more second control loops 42. These control loops control one or more actuators 8a, 8b, 8c, 8d, 8e so as to affect the actual value. To this end, the second control unit 40 may access actuators 8a, 8b, 8c, 8d, 8e that are also used by the first control unit 10. This configuration is implemented in the embodiment shown in FIG. 4 for the step motor 8a. Additionally or alternatively, the second control loops 42 may control one or more actuators 8a, 8b, 8c, 8d, 8e that are not used by the first control unit 10. This is the case in FIG. 4 for the piezo-electric motor 8b and the power controller 8d for the pump laser radiation P. It goes without saying that also different or further actuators may be controlled, such as an electro-optical modulator 8c or a tilting device 8e for a resonator mirror 6a-6e or a rotatable waveplate, as is known from post-published document DE 10 2014 204 941.5.

The second control loops 42 of the second control unit 40 control the corresponding actuators 8a, 8b, 8d on the basis of a signal S4 transmitted thereto as a second input signal from the set of the at least one signal S1, S2, S3, S4 that correlates with an actual value of degree of freedom F. It is also an option that the second control unit 40 may be supplied with several second input signals, based on which the second control loops 42 may control the actuators 8a, 8b, 8c, 8d, 8e. In the embodiment of FIG. 4, the single second input signal is derived from the measurement value W2 of the second measurement device M2 by means of the post-processing unit 24.

As shown in FIG. 4, the second control loops 42 are preferably provided as a cascade. This is particularly advantageous when each of the second control loops 42 accesses a different one of the actuators 8a, 8b, 8c, 8d, 8e. In view of optimizing usage of the signal, it may be advantageous for the first control unit 10 to obtain at least a second input signal. It may be output to one or more first control loops 12. In particular, the state machine 30 should receive the second input signals. This is particularly advantageous when the state machine 30 controls the cascading of the second control loops 42. To this end, the first control unit 10, in particular, the state machine 30, may activate or deactivate, preferably individually, one or more of the second control loops 42.

Based on available data, in particular, based on the first or second input signals, the state machine 30 may assess whether a state of successful stabilizing of the frequency comb has been reached. This is so when the actual value of the degree of freedom F coincides with the target or intended value $F_{intended}$ or is within a stabilizing range $\Delta F_{stabilizing}$. Thereafter, the state machine 30 may display or forward a message indicating the state of successful stabilizing. For example, such a message may be output on the screen 80 or may be input into a computer.

The state machine 30, as well as none, one or several of the first control loops 12 and/or the function generator G may be implemented as a computer executable program, preferably stored on a computer-readable medium.

In particular, fiber lasers may be provided as the inventive frequency comb generators, in particular, the fiber lasers including a non-linear optical mirror (NOLM, non-linear optical loop mirror) or saturable absorbers. A preferred embodiment includes the polarization-maintaining fibers. This results in a particularly efficient stability of the generated frequency comb.

As an example, the automatic stabilizing of the mode spacing of a frequency comb may be considered and may include the following steps:

a) detecting the mode spacing, for instance, by counting the pulse repetition rate of the fs-laser by means of an electronic counter, for instance 252 MHz, b) entering the counter values in a computer, forwarding the counter values to a software-based state machine for controlling the further steps, c) comparing to the given target value of, for instance, 250 MHz, d) setting the step size and direction of change (repetition rate is too high by 2 MHz in the example selected), e) coarsely varying the mode spacing by means of a step motor that changes the resonator length of the fs-laser towards the capture range of the second control, f) iterating the last three steps c) to e) (first control), g) if the actual value is within the capture range of the second control (for example, with a deviation of 1 KHz at the most), activating the second control, h) from this point on: performing detection by means of a phase detector 24 that outputs a signal proportional to the phase difference between the target value and the actual value.

Thereafter, the control to the target value is accomplished with a deviation of, for instance, only 1 mHz by means of a piezo-electric actuator. In case the stabilizing process exits the lock range, for instance, due to external influences, the method is started again at the beginning, that is, starting with step a).

The invention claimed is:

1. A method for operating a laser device (1) comprising the steps:
    a) providing an optical frequency comb having a plurality of modes, the frequencies of which are describable by the formula $f_m = m \times f_{rep} + f_0$, wherein m is a natural number, $f_{rep}$ is a mode spacing and $f_0$ is an offset frequency,
    b) determining at least one signal (S1, S2, S3, S4) that correlates with an actual value of a degree of freedom (F), wherein the degree of freedom (F) is a linear combination of the offset frequency $f_0$ and the mode spacing $f_{rep}$,
    c) transmitting, to a first control unit (10), at least one first input signal, the at least one first input signal being included in a set of the at least one signal (S1, S2, S3, S4),
    d) adjusting, by the first control unit (10), the actual value of the degree of freedom (F) to a predetermined capture range ($\Delta F_{capture}$) of a second control unit (40) on the basis of the at least one first input signal,
    e) activating the second control unit (40), once the capture range ($\Delta F_{capture}$) of the second control unit (40) is reached and,
    f) controlling the actual value to a target value ($F_{intended}$) by means of the second control unit (40),
    characterized in that the second control unit (40) comprises a single second control loop (42) or a group of cascaded second control loops (42) that control, on the basis of a single second input signal (S4) included in the set of the at least one signal, one or more actuators (8a, 8b, 8c, 8d, 8e), wherein the second control loops (42) arranged downstream in the cascading are configured to keep respective second control loops (42) that are arranged upstream within their respective control ranges.

2. The method of claim 1, characterized in that the first control unit (10) comprises a plurality of first control loops (12) that are sequentially used so as to bring the actual value of the degree of freedom (F) into the capture range ($\Delta F_{capture}$) of the second control unit (40).

3. The method of claim 2, characterized in that the sequential usage of the first control loops (12) is controlled by a state machine (30).

4. The method of claim 1, characterized in that the second input signal is derived from a beat signal and the sign of the beat frequency is determined prior to or during the activation of the second control unit (40).

5. The method of claim 1, characterized in that the at least one first input signal comprises the second input signal.

6. The method of claim 1, characterized in that the first control unit (10) separately selectively activates one or more second control loops (42).

7. The method of claim 1, characterized in that the first control unit (10) adjusts one or more of the actuators (8) controlled by the second control loops (42) in parallel or alternatively to the second control unit (40).

8. The method of claim 1, characterized by driving one or more actuators (8), which are independent of the second control unit (40), by means of the first control unit (10).

9. The method of claim 1, characterized in that the first control unit (10) processes at least one actuator signal that represents the control value of an actuator (8).

10. The method of claim 1, characterized in that, when the actual value is outside a set validity range ($\Delta F_{validity}$), the first control unit (10) varies a control value of at least one actuator (8) in a stochastic or uniform manner until the validity range ($\Delta F_{validity}$) is reached again.

11. The method of claim 10, characterized in that a verification determining whether the actual value is within the validity range ($\Delta F_{validity}$) is performed by determining a power level of a beat signal.

12. The method of claim 1, comprising the step of driving at least one actuator (8) depending on one or more previous states of the first control unit (10).

13. The method of claim 1, characterized in that the offset frequency ($f_0$) and the mode spacing ($f_{rep}$) of the frequency comb are stabilized.

14. The method of claim 13, characterized by detecting a state of successful stabilizing and then displaying or forwarding a message indicating the state of successful stabilizing.

15. The method of claim 13, characterized by an algorithm for automatically returning to the stabilized operation, when the state of stabilizing has been left, in particular, by repeating the steps a) to f).

16. A method for operating a laser device (1) comprising the steps:
    a) providing an optical frequency comb having a plurality of modes, the frequencies of which are describable by the formula $f_m = m \times f_{rep} + f_0$, wherein m is a natural number, $f_{rep}$ is a mode spacing and $f_0$ is an offset frequency,
    b) determining at least one signal (S1, S2, S3, S4) that correlates with an actual value of a degree of freedom (F), wherein the degree of freedom (F) is a linear combination of the offset frequency $f_0$ and the mode spacing $f_{rep}$,
    c) transmitting, to a first control unit (10), at least one first input signal, the at least one first input signal being included in a set of the at least one signal (S1, S2, S3, S4),
    d) adjusting, by the first control unit (10), the actual value of the degree of freedom (F) to a predetermined capture range ($\Delta F_{capture}$) of a second control unit (40) on the basis of the at least one first input signal,
    e) activating the second control unit (40), once the capture range ($\Delta F_{capture}$) of the second control unit (40) is reached and,
    f) controlling the actual value to a target value ($F_{intended}$) by means of the second control unit (40),
    characterized in that the first control unit (10) comprises a plurality of first control loops (12) that are sequentially used so as to bring the actual value of the degree of freedom (F) into the capture range ($\Delta F_{capture}$) of the second control unit (40).

17. A method for operating a laser device (1) comprising the steps:
    a) providing an optical frequency comb having a plurality of modes, the frequencies of which are describable by the formula $f_m = m \times f_{rep} + f_0$, wherein m is a natural number, $f_{rep}$ is a mode spacing and $f_0$ is an offset frequency, b) determining at least one signal (S1, S2, S3, S4) that correlates with an actual value of a degree of freedom (F), wherein the degree of freedom (F) is a linear combination of the offset frequency $f_0$ and the mode spacing $f_{rep}$, c) transmitting, to a first control unit (10), at least one first input signal, the at least one first input signal being included in a set of the at least one signal (S1, S2, S3, S4), d) adjusting, by the first control unit (10), the actual value of the degree of freedom (F) to a predetermined capture range ($\Delta F_{capture}$) of a second control unit (40) on the basis of the at least one first input signal, e) activating the second control unit (40), once the capture range ($\Delta F_{capture}$) of the second control unit (40) is reached and, f) controlling the actual value to a target value ($F_{intended}$) by means of the second control unit (40), characterized by driving one or more actuators (8), which are independent of the second control unit (40), by means of the first control unit (10).

18. A method for operating a laser device (1) comprising the steps:

a) providing an optical frequency comb having a plurality of modes, the frequencies of which are describable by the formula $f_m = m \times f_{rep} + f_0$, wherein m is a natural number, $f_{rep}$ is a mode spacing and $f_0$ is an offset frequency, b) determining at least one signal (S1, S2, S3, S4) that correlates with an actual value of a degree of freedom (F), wherein the degree of freedom (F) is a linear combination of the offset frequency $f_0$ and the mode spacing $f_{rep}$, c) transmitting, to a first control unit (10), at least one first input signal, the at least one first input signal being included in a set of the at least one signal (S1, S2, S3, S4), d) adjusting, by the first control unit (10), the actual value of the degree of freedom (F) to a predetermined capture range ($\Delta F_{capture}$) of a second control unit (40) on the basis of the at least one first input signal, e) activating the second control unit (40), once the capture range ($\Delta F_{capture}$) of the second control unit (40) is reached and, f) controlling the actual value to a target value ($F_{intended}$) by means of the second control unit (40), characterized in that, when the actual value is outside a set validity range ($\Delta F_{validity}$), the first control unit (10) varies a control value of at least one actuator (8) in a stochastic or uniform manner until the validity range ($\Delta F_{validity}$) is reached again.

19. A method for operating a laser device (1) comprising the steps:

a) providing an optical frequency comb having a plurality of modes, the frequencies of which are describable by the formula $f_m = m \times f_{rep} + f_0$, wherein m is a natural number, $f_{rep}$ is a mode spacing and $f_0$ is an offset frequency, b) determining at least one signal (S1, S2, S3, S4) that correlates with an actual value of a degree of freedom (F), wherein the degree of freedom (F) is a linear combination of the offset frequency $f_0$ and the mode spacing $f_{rep}$, c) transmitting, to a first control unit (10), at least one first input signal, the at least one first input signal being included in a set of the at least one signal (S1, S2, S3, S4), d) adjusting, by the first control unit (10), the actual value of the degree of freedom (F) to a predetermined capture range ($\Delta F_{capture}$) of a second control unit (40) on the basis of the at least one first input signal, e) activating the second control unit (40), once the capture range ($\Delta F_{capture}$) of the second control unit (40) is reached and, f) controlling the actual value to a target value ($F_{intended}$) by means of the second control unit (40), wherein when the actual value is outside a set validity range, the first control unit drives at least one actuator depending on one or more previous states of the first control unit.

20. The method of claim 17, characterized in that the first control unit (10) processes at least one actuator signal that represents the control value o an actuator (8).

21. The method of claim 18, comprising at least one actuator (8) that is driven depending on one or more previous states of the first control unit (10).

* * * * *